June 26, 1962  S. H. BUSKIRK  3,040,686
SOLDER BAND
Filed June 3, 1958
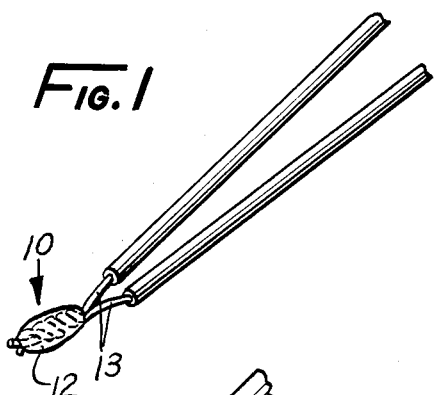
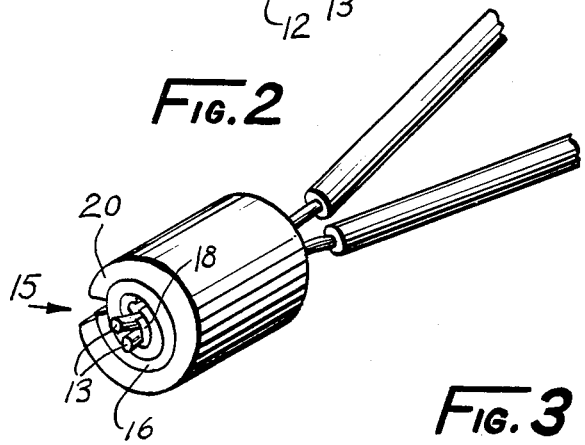
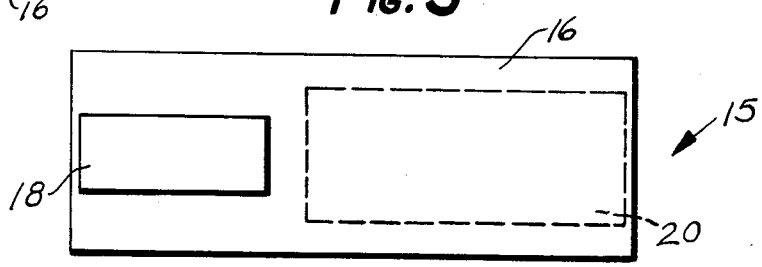
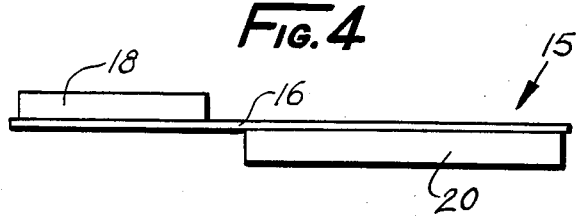
INVENTOR.
Sam H. Buskirk

United States Patent Office 3,040,686
Patented June 26, 1962

3,040,686
SOLDER BAND
Sam H. Buskirk, 10533 Troon Ave., Los Angeles 64, Calif.
Filed June 3, 1958, Ser. No. 739,487
3 Claims. (Cl. 113—110)

This invention relates to connectors and more particularly to apparatus for connecting wires together.

It is an object of the present invention to provide a prefabricated device for soldering wires together in a simple and efficient manner, and without the necessity of having to provide external heating means for melting the solder.

Another object of the present invention is to provide a device of the above type that can be applied as a single unit to the ends of a plurality of wires and ignited to provide melting heat for the solder so as to connect the wires together completely automatically and without the necessity of having to apply separate solder and heat thereto.

Other objects of the invention are to provide a solder band bearing the above objects in mind which is of simple construction, has a minimum of parts, is inexpensive to manufacture and efficient in operation.

For other objects and for a better understanding of the invention, reference may be had to the following detailed description taken in conjunction with the accompanying drawing, in which:

FIGURE 1 is a perspective view of a solder joint formed in accordance with the present invention;

FIGURE 2 is a perspective view of a solder band made in accordance with the present invention applied to a pair of wires to be connected immediately prior to ignition thereof;

FIGURE 3 is a top plan view of a solder band made in accordance with the present invention in an initial condition; and FIGURE 4 is an end elevational view of the band shown in FIGURE 3.

Referring now more in detail to the drawing, and more particularly to FIGURE 1 thereof, a solder joint 10 formed in accordance with the present invention is shown to include a ball 12 of solder that envelops and integrally connects the ends 13 of electrical conductors together. The solder band 15 which produced the joint 10 illustrated in FIGURE 1, is more clearly shown in FIGURES 3 and 4 of the drawing.

This solder band 15 preferably includes a rectangular sheet 16 of fire resistant and heat conductive material, such as aluminum foil, which can be easily bent or rolled so as to assume any desired shape during use. A small strip 18 of solder having a relatively low melting point is attached in any suitable manner to one side of the sheet 16 and adjacent to one end thereof. A pad 20 of flammable material having a relatively low ignition point and a high burning temperature in excess of the melting point of the solder strip 18 is attached in any suitable manner to the opposite side of the sheet 16 adjacent to the opposite end thereof from the solder strip 18. It will be recognized that substantially any type of solid fuel can be used in the pad 20 which has the aforementioned characteristics. Similarly, any type of sheet material may be used for the base sheet 16 and a strip 18 can be composed of any combination of lead solder and flux.

In actual use, the combined band 15 is wrapped around the twisted ends of the wires 13 in the manner shown in FIGURE 2, with the solder strip 18 in contact with the wire ends. By so wrapping the strip, the pad 20 of solid fuel is thus disposed upon the outside of the assembly and can be readily ignited by the application of relatively low temperature heat, such as by a match, or the like. The fuel burns at a high temperature, and the heat produced thereby is transmitted through the heat conductive sheet 16 to the solder strip 18 causing it to melt and enabling it to flow around the wire ends to form the ball 12 illustrated in FIGURE 1. After the parts have cooled, the base sheet 16 is removed from the assembly, leaving the finished joint 10 as shown in FIGURE 1.

These solder bands 15 can be manufactured in single units, such as those shown in FIGURES 3 and 4 of the drawing, in substantially any size so as to be readily adapted for all soldering purposes. In addition, they can be separately packaged or packaged in continuous strips which may be conveniently separated when required. It will also be recognized that the base sheet 16 actually forms a snug fitting mold that shapes the melted solder to the proper shape for each individual joint and prevents leakage of the solder while being subjected to the melting heat. In cases requiring particularly high degrees of heat, it may be possible to use the glass fiber cloth for the base sheet 16 since it will not contaminate the joint composition.

While various changes may be made in the detail construction, it shall be understood that such changes shall be within the spirit and scope of the present invention as defined by the appended claims.

What I claim as new and desire to protect by Letters Patent of the United States is:

1. A solder band comprising, in combination, a noninflammable base of flexible sheet material, electrically conductive material supported upon a portion of said base sheet adjacent a first end thereof and in symmetrical relationship with respect to a longitudinal center line thereof, said electrically conductive material being smaller in area than said base sheet to a degree such as to leave substantially similar free side portions of said base sheet on each side of said electrically conductive material of a width at least half as great as the width of said electrically conductive material, and such as to leave a free second end portion longer than the length of said electrically conductive material extending from a corresponding end of said electrically conductive material, thus providing an encompassing and leak-proof mold when rolled and tightly crimped around said electrically conductive material and wire ends which are to be joined together thereby, and heating means smaller in area than the area of said base sheet supported upon the free second end of said base sheet longitudinally spaced from said electrically conductive material and being symmetrically positioned with respect to a longitudinal center line of said base sheet and of a length at least one-half the length of said base sheet, said heating means having a width dimension less than the width of the base sheet whereby to leave similar free side portions of said base sheet on each side thereof; said electrically conductive material comprising a low melting temperature solder; said heating means comprising a pad of fuel supported upon the opposite side of said base sheet from said solder and having a low ignition temperature and a burning heat temperature higher than the melting temperature of said solder; said base sheet comprising a material with a higher melting temperature than the melting temperature of said solder and the burning heat temperature of said heating means.

2. The combination according to claim 1, wherein said base sheet comprises a rectangular sheet of foil, and wherein said solder comprises a strip of solder supported upon one side of said foil base sheet adjacent to said first end thereof.

3. The combination according to claim 2, wherein said fuel pad is supported upon said opposite side of said foil base sheet from said solder strip adjacent to said second end of said base sheet.

References Cited in the file of this patent

UNITED STATES PATENTS 2,018,117    Birk _____ Oct. 22, 1935